United States Patent Office 2,714,172
Patented July 26, 1955

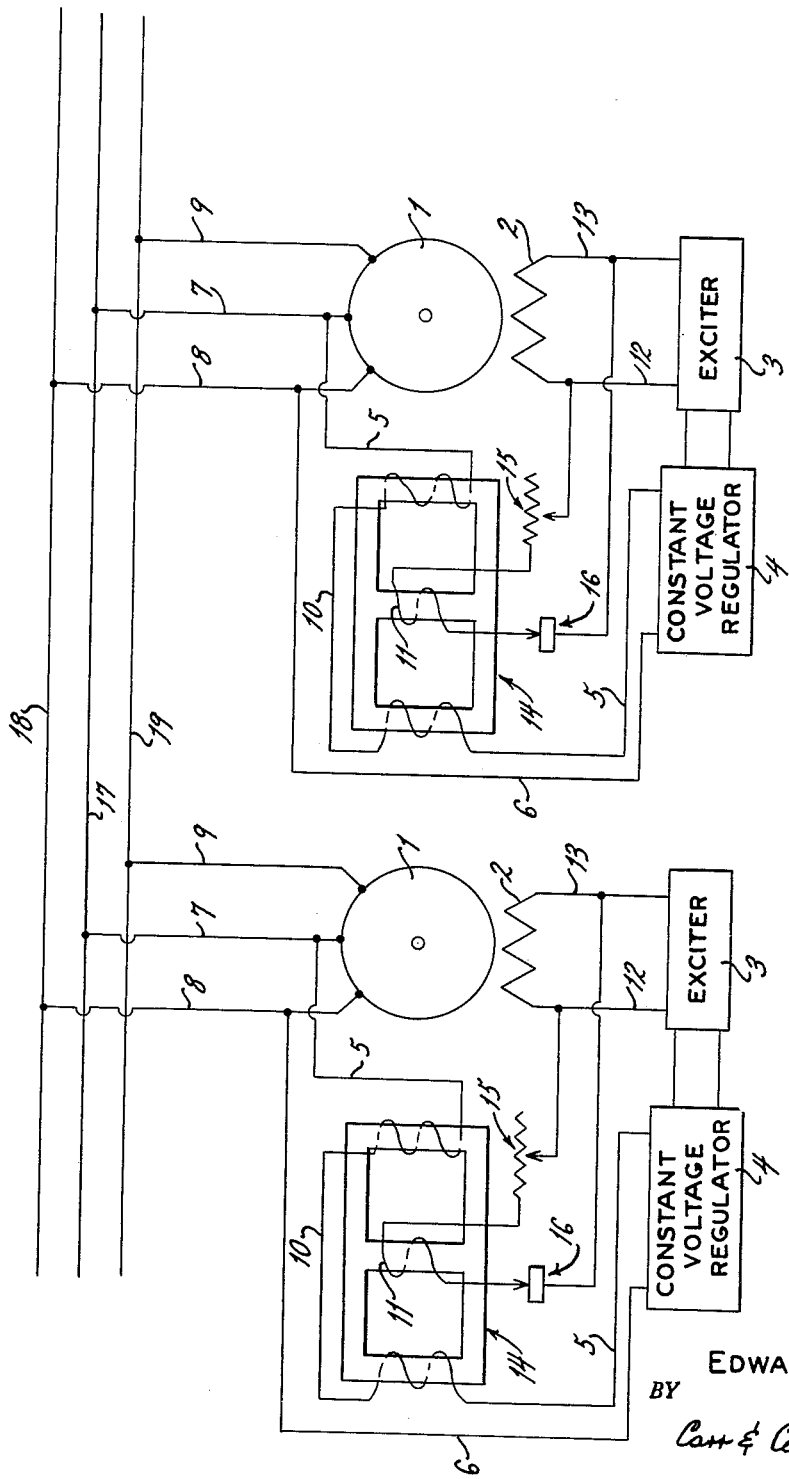

2,714,172

CROSS CURRENT COMPENSATED ALTERNATING GENERATORS

Edward Bretch, University City, Mo.

Application August 17, 1951, Serial No. 242,275

14 Claims. (Cl. 307—51)

This invention relates to cross current compensation for alternating current generators equipped with automatic voltage regulators.

The principal object of the invention is to provide a simple and effective cross current compensator for alternating current generators when operated in parallel, and when the generators are equipped with automatic voltage regulators.

Another object of the invention is to employ the saturable core reactor as a cross current compensator for automatic voltage regulated generators operating in parallel.

The invention has as a further object the use of a saturable core reactor connected into the voltage sensitive circuit of the voltage regulator to equalize the voltage levels maintained by the automatic regulator so that the direct current exciter supplies direct current excitation to its generator proportional to the load the generator is carrying.

The invention consists in the combination of a saturable core reactor having its direct current winding connected with the direct current field winding of the generator so as to furnish a direct current excitation in the saturable core reactor varying with the field current of the generator, and its alternating current winding connected with the voltage sensitive control circuit of the voltage regulator so as to vary the impedance of the voltage sensitive circuit of the regulator with variations of the generator direct current field current.

The invention also consists in the parts and combination and arrangement of parts hereinafter described.

A preferred embodiment of the present invention is illustrated in the single view of the accompanying drawing which is a circuit diagram for two alternating current generators equipped with automatic constant voltage regulators, and the cross current compensators which form the basis for this invention.

When operating two manually controlled alternating current generators in parallel, after the proper adjustments for a given set of load conditions are made, the generators operate in stable equilibrium. The reactive currents circulating between them equalize any slight voltage difference. When the two synchronized generators are thrown together, if their voltages are not exactly equal, the one delivering the higher voltage supplies a lagging current which decreases its voltage while the one delivering the lower voltage supplies a corresponding leading current which increases its voltage until their voltages are automatically balanced. Thus, when lagging currents decrease the generator voltage and leading currents increase it, the voltages of paralleled generators are automatically equalized by the circulating reactive current and they operate in stable equilibrium.

However, if the generators are supplied with automatic constant voltage regulators which maintain a fixed constant generator voltage irrespective of reactive currents, the balancing and stabilizing effect of the reactive currents is missing. Each automatically controlled generator tends to maintain its individual fixed voltage without reference to reactive currents, resulting in a state of unstable equilibrium. Even with the most careful adjustment, a slight change in any of the various factors involved may cause prohibitive circulating currents. Consequently, when alternating current generators equipped with constant voltage regulators are operated in parallel, it is necessary to provide some method of causing them to maintain a slightly decreased voltage level when supplying lagging currents than at unity power factor and an increased voltage level when supplying leading currents. The equalizing of the voltages, so as to eliminate or minimize reactive circulating currents between paralleled generators equipped with constant voltage regulators, is known as cross current compensation. Thus, in order that paralleled alternating current generators equipped with constant voltage regulators may operate in stable equilibrium, their voltage levels should decrease slightly when supplying lagging currents and increase to a much higher level when supplying leading currents so as to withstand high voltage line transients without losing their excitation.

Constant voltage regulators for alternating current generators are operated by means of a voltage sensitive control circuit or circuits connected to either one phase or to a network giving the average voltage of all the phases. The generator voltage variations are picked up by the voltage sensitive control circuit, amplified and applied to the exciter element so as to provide the generator with a varying D. C. exciting current, regulated so as to maintain a constant generator voltage level irrespective of load and power factor condition. In this operation the D. C. exciting current supplied to the generator field varies between wide limits as it requires a materially larger exciting current when supplying lagging currents than at unity power factor and a much lower exciting current when supplying leading currents. Leading currents assist the field excitation and in some cases may oversupply the total excitation required and cause the automatically controlled generator to lose its excitation.

For the purpose of cross current compensation it has been the practcie to provide an auxiliary voltage derived from the line current in time quadrature, at unity power factor, with the generator voltage. This auxiliary voltage is combined vectorially with the generator voltage and the resultant applied to the voltage sensitive control circuit of the voltage regulator. Since the auxiliary voltage is at right angles to the generator voltage at unity power factor it has no material effect on the resultant at unity power factor. As the auxiliary voltage is derived from the line current its phase shifts with that of the line current. The generator voltage is combined vectorially with the auxiliary voltage so that with lagging currents the resultant voltage is greater than the generator voltage and with leading currents it is less. When the higher resultant voltage produced by lagging currents is impressed on the voltage sensitive control circuit it causes the generator to maintain a decreased voltage level when supplying lagging currents. When supplying leading currents the vector voltage is less than the generator voltage causing the generator to maintain an increased voltage level when supplying leading current. This method of cross current compensation is complicated and the results are somewhat limited and erratic.

While it is not difficult to provide the quadrature auxiliary voltage with a polyphase generator, a single phase generator requires the addition of some phase shifting device. As the auxiliary voltage varies with the line current, if it is sufficient to positively stabilize the generators at no load when the only current is the reactive circulating current it is likely to cause the voltage to drop too much at heavy loads and low power factor. Also, it does not provide for an amplified increase in voltage level under the influence of leading currents so as to withstand high voltage transients without losing its excitation.

A simpler and more effective attainment of cross current compensation is provided by the use of the saturable core reactor as a cross current compensator. As is well-known this device is simply an iron core reactor including a direct current winding arranged so that the application of a D. C. excitation to the iron core decreases the impedance of the A. C. circuit. The A. C. winding is connected in series with the voltage sensitive control circuit while its D. C. winding may be connected either in series or in parallel with the generator D. C. field winding so that the D. C. excitation of the saturable core reactor varies with and corresponds to that of the generator field.

When the generator supplies lagging current, its D. C. field excitation is automatically increased by the voltage regulator producing a corresponding increase of the D. C. excitation of the saturable core reactor. This reduces the overall impedance of the voltage sensitive control circuit causing the regulator to maintain a decreased voltage level when supplying lagging currents. When the generator supplies leading current the generator exciting current is decreased by the automatic voltage regulator which decreases the D. C. exciting current in the saturable core reactor and the resulting increase in the overall impedance of the voltage sensitive control circuit causes the generator to maintain an increased voltage level when supplying leading currents.

As the iron core of the saturable core reactor is normally saturated by the D. C. excitation to a point at or near the knee of its saturation curve the impedance of its A. C. winding decreases only slightly with increase of D. C. excitation within its normal operating range. For the purpose of stabilizing the generators, only a slight change of impedance of the saturable core reactor is required. However, if the generator is subjected to a high voltage transient which would normally overpower its field excitation, as the field excitation decreases the excitation of the saturable core decreases correspondingly and at low magnetic saturation the impedance of its A. C. winding is greatly increased. The increased voltage level produced by the insertion of this extremely high impedance into the voltage sensitive control circuit allows the generator to withstand high voltage transients without losing its excitation.

This ability to withstand high voltage transients may be still further amplified by inserting in the D. C. circuit of the reactor a non-linear resistance such as a selenium rectifier with the D. C. current flowing through it in the high resistance direction. With the non-linear resistance the overall resistance of the reactor D. C. circuit increases very rapidly as the current approaches zero giving the effect of opening the D. C. circuit before the generator excitation becomes zero and thereby preventing the loss of generator excitation by high voltage transients.

Other advantages of the saturable core reactor as a cross current compensator are the simplicity of its application and its positive and direct action. There is no problem of phase relations, as with the quadrature voltage method of cross current compensation. With the saturable core reactor the polarity or direction of its excitation is not a factor. Also, since the saturable core reactor operates from the generator field excitation of the generator, its response is more rapid and its application to a single phase generator is as simple as that of a polyphase generator.

Referring to the drawing, the circuit diagram shows the operating components of typical alternating current generators embodying the present improvement. The generator 1, connected to the main lines 17, 18 and 19 by leads 7, 8 and 9, respectively, is excited by a direct current flowing through the field winding 2 from the exciter shown at 3. The voltage variations of the generator 1 are impressed on the regulating means 4 through circuit leads 5 and 6 connected to the generator output leads 7 and 8, respectively, across one phase of the generator. However, the voltage may be taken across one section of an interchangeable voltage winding or from line to neutral. In a high voltage generator a potential transformer (not shown) may be inserted with its primary across the leads 7 and 8 and its secondary across the leads 5 and 6. Specific conditions will determine the method of application. The regulator element 4 may include resistors, reactors, solenoids, pilot motors, vibrating contacts or any of the various devices employed in voltage regulators. Likewise, the excitation at means 3 may be derived from any of the well-known sources of D. C. excitation such as an individual exciter, a fixed source of D. C. power or a rectified alternating current, all of which have been successfully employed in voltage regulators. The regulator means 4 controls the exciting means 3 so that the exciter supplies a variable D. C. excitation to the generator field winding 2 regulated so as to maintain a fixed constant voltage across the regulator leads 5 and 6, irrespective of the load and power factor conditions imposed on the generator 1. Obviously in this combination reactive currents are not a factor in the voltage level maintained by the generator 1.

In order to cause the generator 1 to maintain a slightly decreased voltage level when supplying lagging currents as required for parallel operation a saturable core reactor 14 is connected as shown to serve as a cross current compensator. The A. C. winding 10 of the saturable core reactor 14 is inserted in series with the voltage sensitive circuit of the regulator 4 formed by the lead 5. In this case, the D. C. winding 11 of the saturable core reactor 14 is connected in parallel with the generator field winding 2, at the leads 12 and 13. When the generator supplies lagging current, the voltage regulator 4 automatically increases the D. C. exciting current in the field winding 2 as well as in the D. C. winding 11 of the saturable core reactor 14, decreasing the impedance of the A. C. winding 10 which is in series with the voltage sensitive circuit, represented by leads 5 and 6. Since the regulator 4 maintains a fixed constant voltage and the impedance of winding 10 has been decreased, it now requires a lower voltage at generator 1 to maintain the fixed voltage at the regulator. Thus, when the generator supplies lagging currents, although the voltage at the regulator 4 remains fixed, since the impedance in the voltage sensitive control circuit has been decreased, it requires a lower generator voltage to maintain the fixed voltage at the regulator 4 when supplying the lagging current. In reverse, a higher generator voltage is required to maintain the fixed voltage at the regulator 4 when the impedance of winding 10 is increased by the decreased excitation required when the generator supplies leading current.

The variable resistance 15 adjusts the amount of the compensation or the change of voltage level between leading and lagging conditions. It is obvious that as the resistance 15 is increased, the effect of changes of the D. C. generator exciting current is decreased and with infinite resistance, or open circuit, the A. C. winding 10 would be merely a fixed impedance and there would be no cross current compensation. The non-linear resistance 16, as previously explained, is for the purpose of increasing the voltage level maintained by the regulator quickly to a high value as the generator excitation approaches zero so that it may withstand high voltage transients without losing its excitation. The A. C. winding 10 is generally designed for a particular condition and is not usually provided with adjustments. However, in some special cases it may be desirable to provide a tapped winding or some means of adjustment.

As standard constant voltage regulators contain within their own structures the controls for their adjustments, the only controls indicated in the drawing are those directly related to the application of the saturable core reactor as a cross current compensator.

In service it is found that the saturable core reactor also serves the purpose of an effective anti-hunting device. So far as is known, all previous methods of cross current compensation operate from the reactive currents developed in the generator output circuit. The means herein disclosed should be understood as directed broadly to the use of the automatically controlled D. C. excitation supplied to the generator to operate the cross current compensating device. It is understood also as directed broadly to the provision of an inductive alternating current winding in the voltage sensitive circuit of the voltage regulator, and means magnetically coupling the inductive alternating current winding with the generator direct current exciting field winding so that the impedance of the voltage sensitive circuit varies with variations in the excitation of the generator exciter field.

What I claim is:

1. The combination in an alternating current generator connected in parallel with another voltage source, of a generator having an armature winding and a field winding circuit, a plurality of leads connected to said armature winding, an exciter interconnected with said field winding circuit, a regulator for said exciter, a voltage sensitive circuit interconnecting the armature winding leads and the regulator, a magnetic core having a plurality of windings thereon, means connecting at least one of said windings in said voltage sensitive circuit, and means connecting at least one of the windings of said magnetic core in the field winding circuit.

2. The combination in an alternating current generator connected in parallel with another voltage source, of a voltage regulator, a generator voltage sensitive circuit connected to said voltage regulator, a generator exciter field connected with said voltage regulator, and cross current compensating means including a magnetic core coupling together the voltage sensitive circuit and the exciter field of the generator.

3. The combination set forth in claim 2, wherein said cross current compensating means includes a winding on the magnetic core connected in the voltage sensitive circuit, a winding on the magnetic core connected with the exciter field, and a variable resistance in said winding connected with the exciter field to adjust the magnitude of the cross current compensation per unit change in the exciter field.

4. In an electrical distribution system, a plurality of generators connected in parallel, each generator having a voltage regulator associated therewith, an exciter connected with said regulator, a voltage sensitive circuit connected between said regulator and the output of its generator, and a generator exciter field; and a cross current compensator for each generator comprising a saturable core reactor having an inductive winding connected in said voltage sensitive circuit and a winding connected with said exciter field.

5. The combination set forth in claim 4, which includes a variable resistance and a non-linear resistance in the winding circuit connected with said exciter field.

6. A cross-current compensated voltage source, comprising a generator with a plurality of load leads and a field winding circuit; a constant voltage regulator associated with the field winding circuit; a voltage sensitive circuit connected to the voltage regulator and the generator load leads; and means for varying the impedance of the voltage sensitive circuit responsive to variations in the field winding circuit.

7. A cross-current compensated voltage source, comprising a generator with a plurality of load leads and a field winding circuit; a constant voltage regulator associated with the field winding circuit; a voltage sensitive circuit connected to the voltage regulator and the generator load leads; and means including a saturable core reactor for varying the impedance of the voltage sensitive circuit responsive to variations in the field winding circuit.

8. A cross-current compensated voltage source, comprising a generator with a plurality of load leads and a field winding circuit; a constant voltage regulator associated with the field winding circuit; a voltage sensitive circuit connected to the voltage regulator and the generator load leads; an inductive alternating current winding in the voltage sensitive circuit; and means magnetically coupling said inductive winding with the field winding circuit for varying the impedance of the voltage sensitive circuit responsive to variations in the field winding circuit.

9. A cross-current compensated voltage source, comprising a generator with a plurality of load leads and a field winding circuit; a constant voltage regulator associated with the field winding circuit; a saturable core reactor containing a plurality of windings magnetically coupled together; a voltage sensitive circuit connected to the voltage regulator and the generator load leads and containing at least one of the reactor windings; and means interconnecting at least one of said reactor windings with the field winding circuit whereby the impedance of the voltage sensitive circuit varies responsive to variations in the field winding circuit.

10. A cross-current compensated voltage source, comprising a generator with a plurality of load leads and a field winding circuit; a constant voltage regulator associated with the field winding circuit; a saturable core reactor containing a plurality of windings magnetically coupled together; a voltage sensitive circuit connected to the voltage regulator and the generator load leads and containing at least one of the reactor windings; circuit means interconnecting at least one of said reactor windings with the field winding circuit; and a variable resistance in said circuit means.

11. A cross-current compensated voltage source, comprising a generator with a plurality of load leads and a field winding circuit; a constant voltage regulator associated with the field winding circuit; a saturable core reactor containing a plurality of windings magnetically coupled together; a voltage sensitive circuit connected to the voltage regulator and the generator load leads and containing at least one of the reactor windings; circuit means interconnecting at least one of said reactor windings with the field winding circuit; and a non-linear resistance in said circuit means for preventing the loss of generator excitation by high voltage transients in the generator load leads.

12. In combination, at least two alternating current generators connected in parallel, each containing a plurality of load leads and a field winding circuit; a constant voltage regulator associated with each field winding circuit; a voltage sensitive circuit connected between the voltage regulator and the load leads of each generator; a saturable core reactor for each generator containing a plurality of windings magnetically coupled together; means connecting at least one of said reactor windings in the voltage sensitive circuit of its generator; and means connecting at least one other winding in the field winding circuit of said generator.

13. A cross-current compensated voltage source, comprising a generator with a plurality of load leads and a field winding circuit; a constant voltage regulator associated with the field winding circuit; a voltage sensitive circuit connected to the voltage regulator and the generator load leads; an inductive alternating current winding in the voltage sensitive circuit; and means including a saturable core reactor magnetically coupling said inductive winding with the field winding circuit for varying the impedance of the voltage sensitive circuit responsive to variations in the field winding circuit.

14. A cross-current compensated voltage source, comprising a generator with a plurality of load leads and a field winding circuit; a constant voltage regulator associated with the field winding circuit; a voltage sensitive circuit connected to the voltage regulator and the generator load leads; an inductive alternating current winding in the voltage sensitive circuit; and means magnetically coupling said inductive winding with the field winding circuit for varying the impedance of the voltage sensitive circuit responsive to variations in the field winding circuit, said last named means including a non-linear resistance for preventing the loss of generator excitation by high voltage transients in the generator load leads.

References Cited in the file of this patent

UNITED STATES PATENTS

| | | |
|---|---|---|
| 1,847,585 | Ytterberg | Mar. 1, 1932 |
| 2,066,919 | West | Jan. 5, 1937 |
| 2,476,805 | Bradley | July 19, 1949 |

FOREIGN PATENTS

| | | |
|---|---|---|
| 318,806 | Germany | Feb. 11, 1920 |